Feb. 7, 1933.   W. D. SARGENT ET AL   1,896,803
VEHICLE WHEEL
Filed Dec. 17, 1926

Inventors
William D Sargent
Charles G Keller
By their Attorneys

Patented Feb. 7, 1933

1,896,803

UNITED STATES PATENT OFFICE

WILLIAM D. SARGENT, OF WEST ORANGE, NEW JERSEY, AND CHARLES G. KELLER, OF POUGHKEEPSIE, NEW YORK; SAID SARGENT ASSIGNOR TO DURAFER (INC.), OF DOVER, DELAWARE, A CORPORATION OF DELAWARE

VEHICLE WHEEL

Application filed December 17, 1926. Serial No. 155,375.

This invention relates to that type of wheels which have braking elements thereon, whereby the rotation of the wheel may be retarded or stopped at will. The invention relates more particularly to the construction of the brake flange and the construction of the wheel whereby this brake flange may be readily secured in place.

In an automotive vehicle wheel it is desirable to provide adequate strength to support the load, resist side thrust, and resist the torsional and other strains resulting from severe braking action. The materials which are best adapted for use in the hubs and spokes are not ordinarily best adapted for resisting the wear and heating action of brake shoes or other braking members.

One object of our invention is to so design and construct the parts that the wheel structure may be made of material best adapted to give adequate strength for supporting the load and resisting side thrust, and a brake flange or flanges may be made of material best adapted to withstand rubbing friction of brake shoes and road material or other substances which may be accidentally interposed and which are likely to groove the surface of the brake flange.

A further object is to so construct the wheel and brake flange that different sizes of brake flanges or a plurality of brake flanges of different sizes may be used on the same wheel.

As an important feature of the invention the wheels and brake flanges are so constructed that the brake flanges may be made of open ended cylindrical sections of any desired material. They may be made by cutting off successive sections from steel tubing of the proper diameter and without further machining or any bending, stamping or other forming operation. A flange may also be made by bending a piece of bar stock to form a ring, and butt welding the ends together, or by casting, or in various other ways.

As a further important feature of the invention the wheel is provided with an annular axially extending attaching means so formed and so positioned that an open ended cylinder constituting the brake flange may be telescoped therewith and directly secured thereto by spot welding, bolts, rivets, or other means. This axially projecting attaching means presents concentric outer and inner surfaces whereby a cylindrical brake flange may be telescoped outside and secured in place, or a smaller brake flange may be telescoped inside and secured by the same means. Obviously it also permits both the smaller inner brake flange and the larger outer one to be employed at the same time if desired, and without any change in the construction of the wheel, and without special adapters or connecting means. There may be two separate concentric attaching means for two separate brake flanges.

The attaching means is preferably an annular row of lugs which may be formed on the spokes adjacent to but spaced from the outer ends of the latter, or may be formed between the spokes on a web or disc formed integral with the spokes. Thus the conducting of heat from the brake flange to the tire is reduced to a minimum, the heat is effectively dissipated, and the spokes themselves transmit to the hub and tire the action of the brake when the latter is applied to the brake flange.

The cylindric surface or surfaces of the attaching means may be machined at the same time that the hub, periphery and other concentric surfaces are machined, so that the brake flange will be concentrically positioned.

By means of our invention the hub and spokes may be made of any desired material, as for instance, pressed steel, a casting or an assembly of separate parts and with spokes or a disc while the brake flange may be made of high carbon steel, alloy steel heat treated, gun iron, chilled cast iron, soft steel plated with chromilite or in any other way, especially adapted to give the desired hardness and withstand rubbing friction.

In a preferred construction embodying our invention the weight of the wheel is very greatly reduced without reducing the strength. The felly is omitted, the rim or rims are secured directly to the ends of the spokes, the spokes are cast integral with the hub, the usual flanges on the hub and the brake drum are eliminated, and the cylindrical brake flange is attached directly to lugs cast integral with the spokes. The retaining bolts or rivets extend radially instead of axially and are in the same circumference as the brake flange so as to withstand the strain in the most effective manner.

In the accompanying drawings, there are illustrated certain embodiments of the invention. These are to be considered in an illustrative rather than in a limiting sense.

Figure 1:
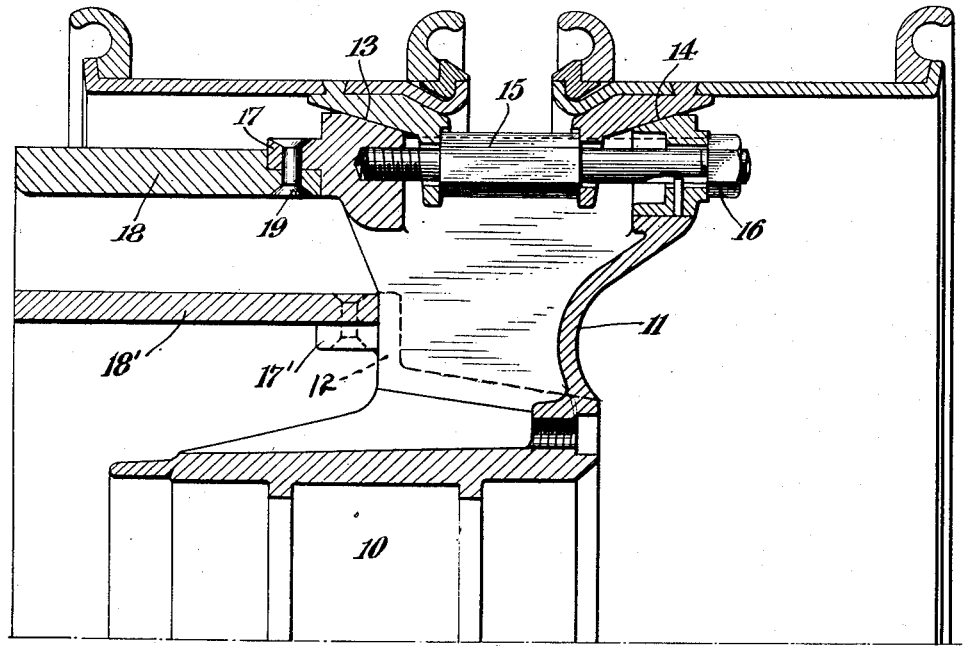
Fig. 1 is a radial section in axial plane of a wheel for twin tires, constructed in accordance with our invention.
Figure 2:
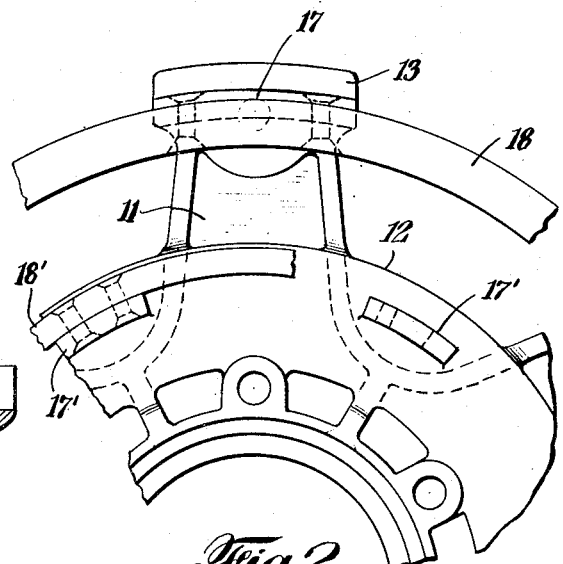
Fig. 2 is a partial end view, the rims being removed.

In Figs. 1 and 2 there is illustrated a vehicle wheel for twin tires, certain features of which relating to the means for securing the tire rims in place, constitute no portion of the present invention, but are claimed in a copending application. In the form here illustrated there is provided a hub 10 having a series of radially extending spokes 11 cast integral therewith. Each spoke is substantially U-shaped in cross section and the free edges of the side walls of each U are connected to the corresponding edges of the sides of the adjacent spokes by a web 12.

There is no felly, each spoke at its outer end being provided with a head serving for the direct attachment of the tire rim thereto. The spokes are reinforced or braced by the connecting web and at their outer end portion by the brake flange hereinafter described. The spokes may be considered as ribs or corrugations on the web which reinforce the latter. The wheel when viewed from the outer side may have an appearance similar to the ordinary spoke wheel with the ordinary brake drum. This appearance may be accentuated by painting the spokes to look like wood and painting the web black or of appropriate color.

As illustrated the head has a pair of parts or elements 13 and 14 which are relatively movable toward and from each other and present inclined surfaces for engagement with the two rims. A series of clamping bolts 15 each has a shoulder for holding the inner rim on the element 13 and another shoulder serving as a stop for the other rim. This second rim is held by a nut 16 which forces the element 14 toward the last mentioned shoulder of the clamping bolt.

Each spoke head preferably has an aperture therethrough in an axial direction whereby a current of air may be forced lengthwise of the spoke within the channel of the spoke by the action of centrifugal force, and then outward radially between the adjacent tires. This air current cools the inside of the brake flange and the brake. Air is also forced radially by the action of the substantially flat sides of the spokes and this air coming from the outside is cooler and may serve to cool the tire and the brake drum.

As an important feature of our invention illustrated in Figs. 1 and 2, the head of each spoke is provided with an axially extending lug 17 which has outer and inner concentric cylindric surfaces. To these lugs there is bolted, riveted or welded the brake flange 18. This brake flange is an open-ended cylindrical section adapted to telescope with the series of lugs 17.

The lugs are adapted to take the brake drum upon the outer surfaces thereof or upon the inner surfaces, whereby either of two sizes of brake flanges may be attached to the same series of lugs. The brake flange illustrated is secured to the inner surface of the series of lugs by means of rivets 19, but it will of course be obvious that if a larger size of brake drum is employed it will be secured to the outer surface of the lugs, and that instead of rivets, any other equivalent form of securing means such for instance as bolts or spot welding might be employed. The securing members 19 are in the same circumference as the brake flange, so that the strain on them through severe braking action is reduced to a minimum. It will be noted that the brake flange does not have any end wall or radially projecting parts and is merely a tube section constituting a cylindrical wall. By the term "brake flange" we mean such cylindrical wall as distinguished from the ordinary brake drum.

As a further important feature the brake flange may be carried by the web 12 instead of by spokes. We have shown the web, provided with a plurality of lugs 17' extending axially and serving to support a brake flange 18'. This is of smaller diameter than the brake flange 18 but telescopes with the lugs 17' in the same way that the flange 18 telescopes with the lugs 17. It is shown outside of the lugs, but might be secured to the inside if the appropriate size of flange be employed.

By placing the lugs 17' at a distance from the outer edge of the web equal to the thickness of the brake flange, the latter, when secured in place, will appear as an integral extension of the web, but from a structural standpoint this is not essential.

The two brake flanges may both be employed with separate brakes such as the ordinary foot brake and the emergency brake. If only one brake is used on the wheel, either brake flange may be omitted.

The brake flange may be made of any suitable material without regard to the material used in making the body portion of the wheel. It may be selected of such material as will give the best resistance to the wearing and heating effect of the brake shoes. It may be of chilled cast iron or may be heat-treated in any suitable manner to give a hard surface or may be plated with chromilite. The character of the material of the brake flange may be varied according to the service conditions to which the wheel is to be subjected. The purchaser of the wheel may designate any particular character of brake flange which he desires. Preferably the brake flange is made somewhat thicker than the walls of the spokes, but this is not essential as the proportions may be varied at will. The brake flange may be made much thicker so as to more effectively absorb, conduct away and dissipate the heat from the braking action. This thickness presents no manufacturing difficulty as is the case where the brake drum has an integral end wall or has radial parts for attachment to the wheel.

It is important that the wheel presents a cylindrical surface which may be either a continuous cylinder or spaced cylindric sections on separate lugs, and that the brake flange telescope on to or within this surface.

Figure 3:
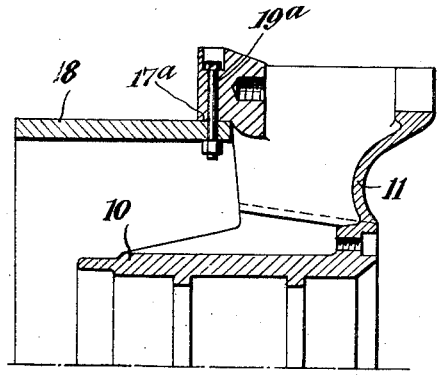
Fig. 3 is a section showing another form which the invention may assume.

In Fig. 3 a form is shown in which the heads of the several spokes have radially facing cylindric surfaces 17a to which the brake flange may be attached by clamping bolts 19a. This construction is suitable where only one size of brake flange is to be employed.

The forms shown in the accompanying drawings are merely illustrative of the invention, and it will be evident that other forms might be designated within the scope of our invention as defined in the appended claims.

Having thus described our invention what we claim as new and desire to secure by Letters Patent is:

1. A fellyless vehicle wheel having a hub, spokes cast integral therewith, a web connecting the spokes, a head at the outer end of each spoke and a lug carried by each head, said lugs presenting cylindrical surfaces for the attachment of a cylindrical brake flange thereto.

2. A fellyless wheel having a hub, a series of spokes cast integral therewith and U shaped in cross section, a web also integral with the hub and spokes and connecting the edges of each spoke with those of the adjacent spokes, each of said spokes having a head thereon with an opening therethrough for the passage of air lengthwise of the channel of the spoke and through the head of the spoke, said heads serving to support two separate rims upon opposite sides of the apertures, and each head having an axially projecting lug presenting a pair of concentric cylindrical surfaces, an open ended cylindrical brake flange telescoping with said lugs, and fastening members connecting said brake flange to said lugs.

Signed at Newark, in the county of Essex, in the State of New Jersey, this 14th day of December, 1926.

WILLIAM D. SARGENT.
CHARLES G. KELLER.